Figure 1:
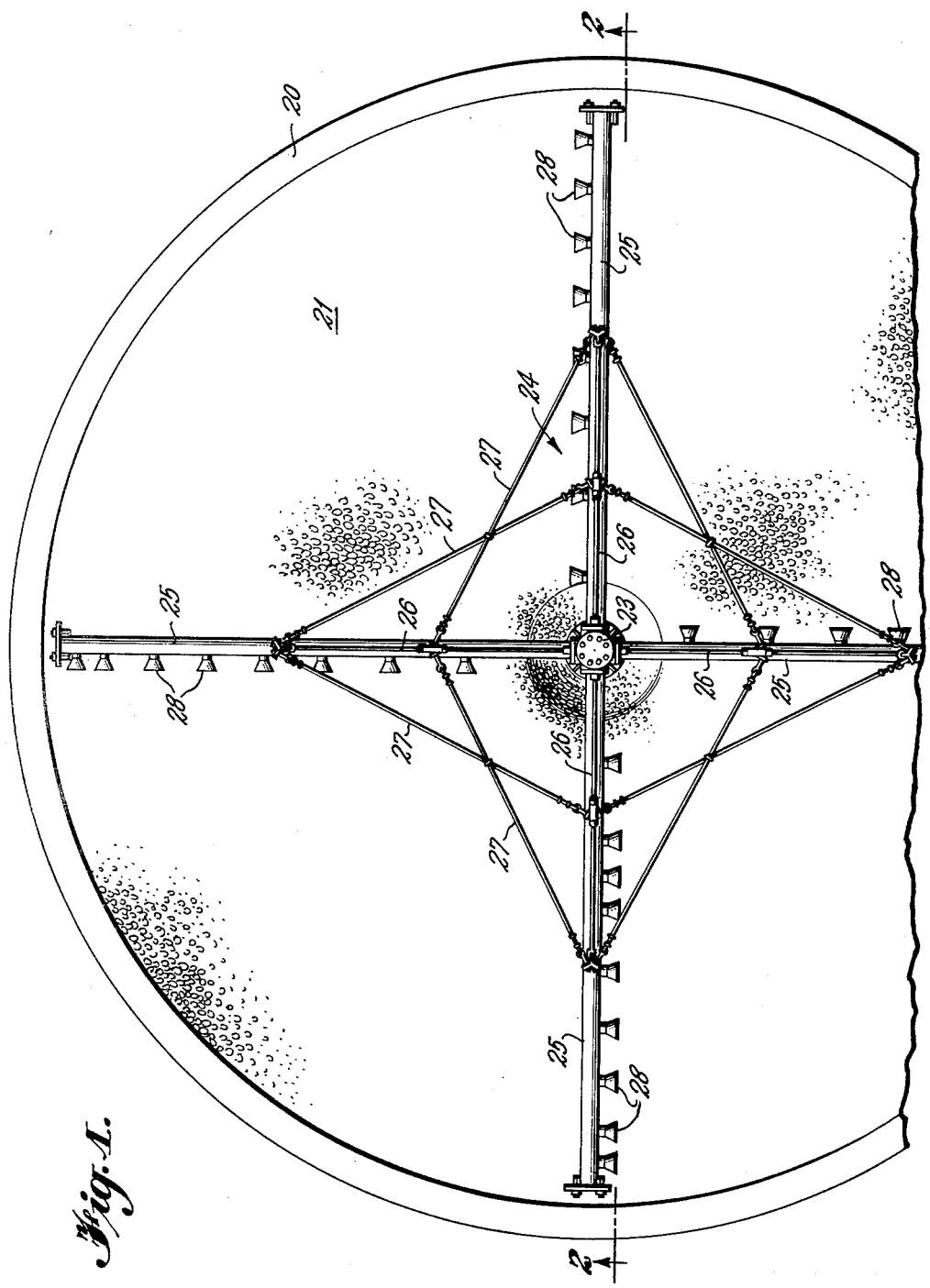

July 24, 1962

A. McILHENNY 3,045,924

LIQUID SEWAGE ROTARY DISTRIBUTOR

Filed July 16, 1959

6 Sheets-Sheet 1

July 24, 1962
A. McILHENNY
3,045,924
LIQUID SEWAGE ROTARY DISTRIBUTOR
Filed July 16, 1959
6 Sheets-Sheet 2
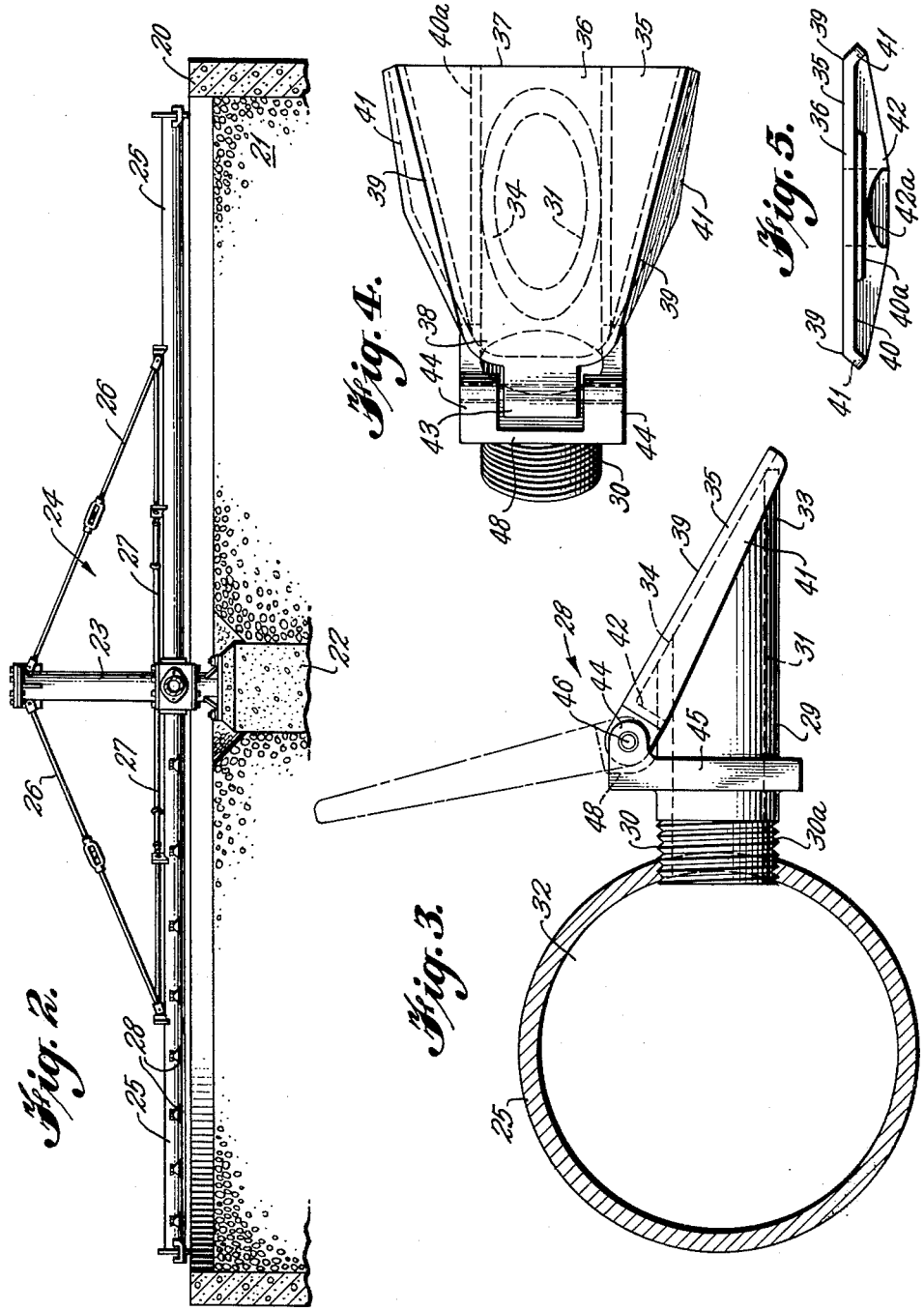

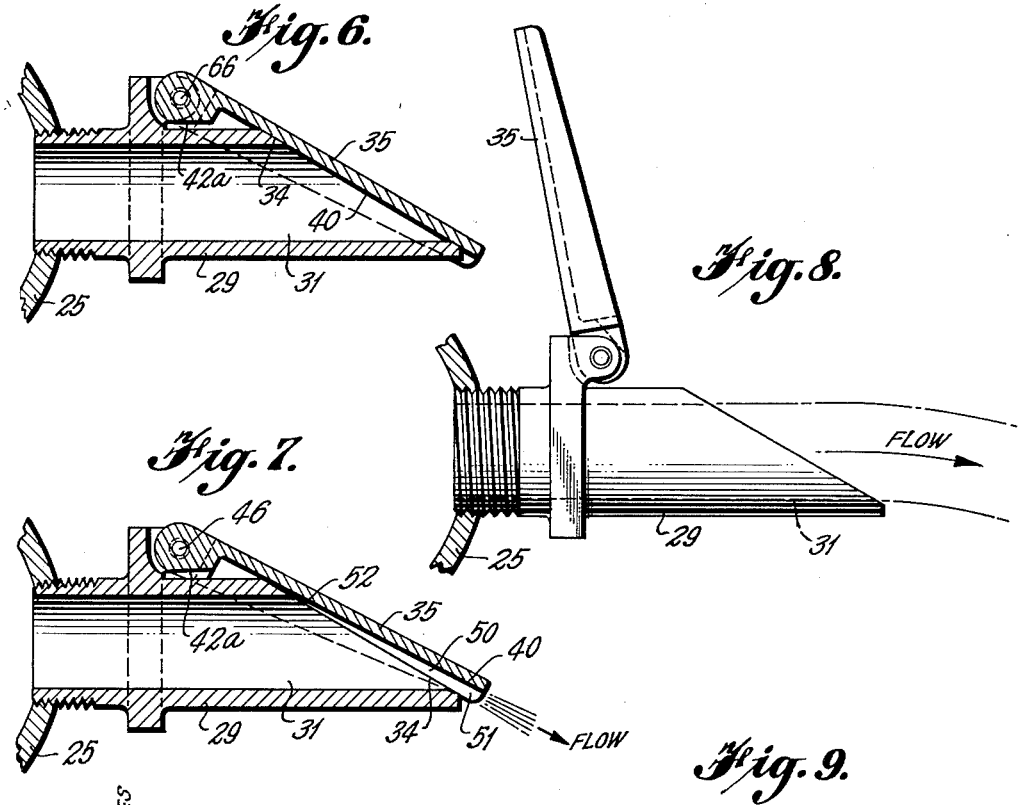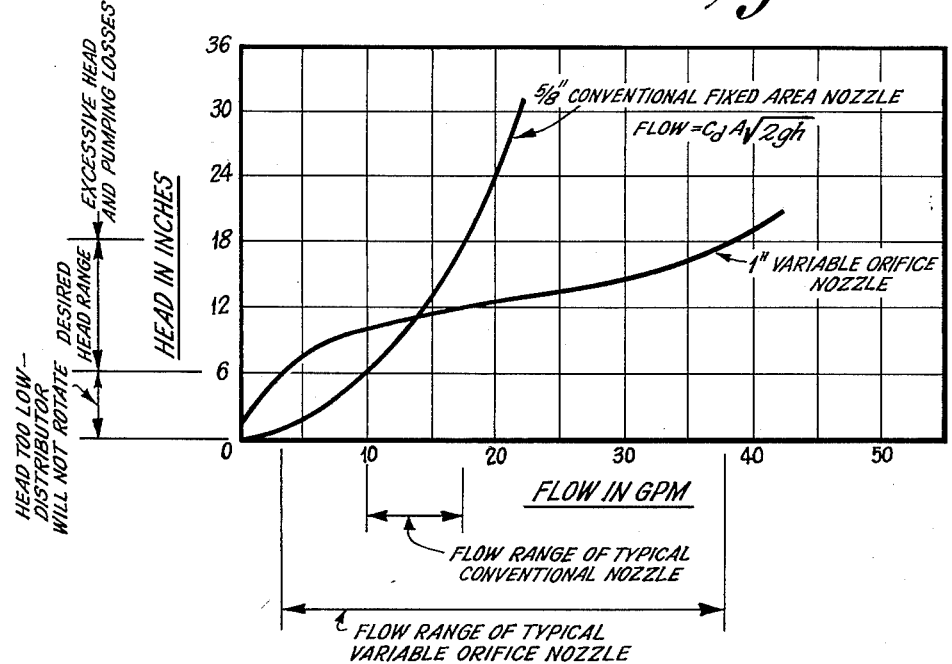

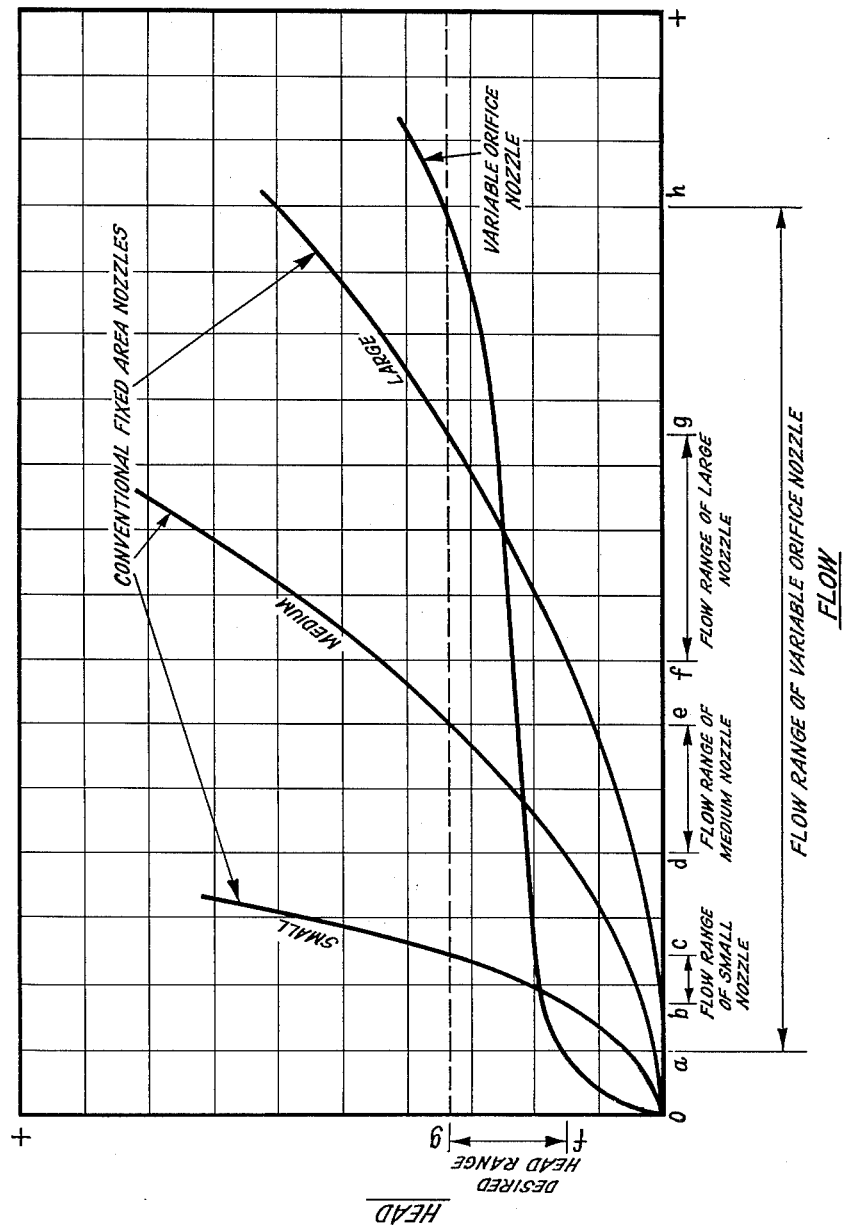

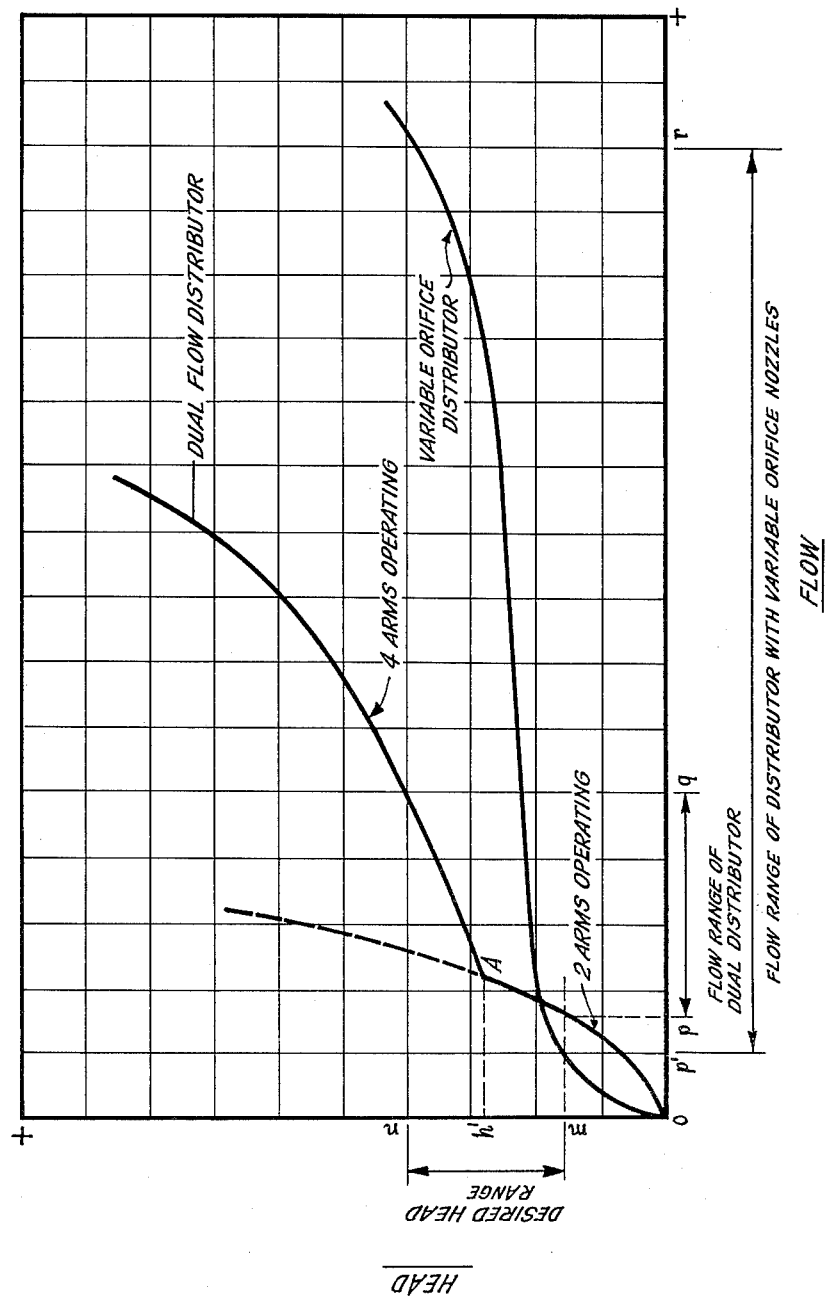

3,045,924
LIQUID SEWAGE ROTARY DISTRIBUTOR
Alan McIlhenny, Newtown Square, Pa., assignor to Link-Belt Company, a corporation of Illinois
Filed July 16, 1959, Ser. No. 827,530
2 Claims. (Cl. 239—254)

This invention relates to rotary distributors which are used in sewage treatment plants for applying liquid sewage to trickling filters, and more particularly deals with a variable effective orifice area nozzle for such distributors.

Rotary distributors, as widely used today in connection with circular trickling filters, commonly include a rotary column mounted in the center of the filter bed, hollow arms radiating from the column which sweep over and above the surface of the bed, and nozzles attached to the arms for spraying sewage onto the bed as the arms move. The sewage flows from the center column through the arms to the nozzles, and rotary movement is imparted to the distributor by the reaction forces developed from the flow through the nozzles. That is, the nozzles open in a direction generally opposite to the direction in which the arms travel so that the flow through the nozzles has a jet propelling action on the arms.

Until the development of the present invention, however, rotary distributors have had several disadvantages creating problems in connection with their use. These include the inability of the distributors to operate satisfactorily at flows much above or below the normal flow for which a particular distributor is designed. For example, an excessive increase in head, resulting in high pumping costs, is usually required to increase the flow rate through the distributor a substantial amount above the normal flow rate, and the maximum flow rate obtainable is often less than needed to handle storm flow to the sewage system. Also, when the head is increased to obtain a high flow rate, the propelling effect of the nozzles is correspondingly increased so that the distributor tends to develop excessive rotative speeds and to produce a less efficient distribution of the sewage.

At low flow rates conventional rotary distributors are usually sluggish and erratic in their rotation and sometimes refuse to move at all. If the flow rate is reduced much below normal, the reaction forces produced by the nozzles will be greatly diminished and the propelling effect accordingly reduced. This low propelling effect at low flow rates is particularly troublesome when starting a distributor. It generally means that a nearly full flow through the nozzles must be provided to start the distributor in motion. Since the distributor moves slowly at first, the full flow emitted from the nozzles during starting is concentrated for relatively long periods on small areas of the filter bed, and the rate of application to these areas may be so great as to wash much of the zoogloeal film from the filter medium.

One development aimed at providing a greater flow range for rotary distributors has been the "dual flow" unit, such as shown in the patent to Nels B. Lund, No. 2,029,268, dated January 28, 1936. A dual flow distributor generally has four arms with only two being supplied with sewage under low head and low flow conditions while the other two arms are shut off from the sewage supply. At higher heads the sewage overflows weirs, or the like, located in the distributor column and enters the two previously unused arms for distribution from all four. Thus, an increase in head sufficient to bring the second pair of arms into action produces a much larger increase in flow through the distributor than would otherwise be the case. Dual flow units, however, are more costly than conventional distributors, and the increase in flow range obtained is not all that could be desired. As is the case with conventional distributors, dual flow units have limited maximum flow capacities which are often below storm flow requirements, and the problems attendant when starting at low flow are not eliminated.

In another development, covered by the patent to Hubert Beddoes, No. 2,046,865, dated July 7, 1936, the nozzles on the distributor arms are provided with deflectors which are pivotally mounted and are of such a construction as to automatically control only the jet propulsion and distribution action to accommodate variable sewage flow conditions. Conventional nozzles having fixed orifice sizes discharge a stream or jet of sewage against a fixed deflector, inclined to the flow, which serves to form the stream into a wide sheet or spray that falls gently onto the filter bed. These fixed deflectors, however, absorb part of the jet propulsion action produced by the associated nozzles so that not all of the potential force is made available for driving the distributor. This loss of available propelling effort is overcome with the pivotal deflectors which are moved into positions where they will obstruct the emitted streams of sewage to a lesser degree as the flow through the nozzles is increased. With the deflectors so moved, virtually the full reactive force of each nozzle is applied to the propulsion of the distributor.

The pivoted deflectors, however, move only in response to a high flow through the nozzles, and thus to obtain a full propelling effort a high head and high flow are necessary. Under normal head and flow conditions the deflectors are not moved relative to the paths of the emitted streams and no appreciable increase in propelling effort is obtained. A distributor with pivoted deflectors must, therefore, be started at a high head in order to be brought up to normal speed in less time than a conventional fixed deflector distributor operating under the same head. With the deflectors moved to less obstructing positions, the streams remain substantially solid and strike the filter bed with a force which is likely to wash a large part of the zoogloeal film from the filter medium. In addition, the use of a pivotal deflector in conjunction with a fixed orifice nozzle does not appreciably change the nozzle's head versus flow characteristics. Therefore its flow range remains substantially the same regardless of whether the pivotal deflector is or is not used.

The primary object of this invention is to provide a rotary distributor for dosing a trickling filter bed, the distributor having a wide flow range with large variations in the flow through the distributor being accomplished with relatively small changes in the hydrostatic head of the sewage supplied to the distributor by means of nozzles which are so constructed as to automatically vary their effective orifice areas in response to variations in hydrostatic head.

Another object of this invention is the provision of a rotary distributor which may be started from a stationary position with a minimum applied head and flow; which rotates at a relatively constant speed throughout the operating flow range; and which does not rotate at excessive speeds at maximum flow.

Another object of this invention is to provide a rotary distributor having a wider range of flow rates over a smaller or equal range of applied heads than a comparable dual flow distributor, and in which all of the nozzles are operative at all times to provide a more uniform distribution of sewage over the filter bed in the low flow range.

A further object of this invention is to provide a nozzle for a rotary sewage distributor which is so constructed as to meter the flow of sewage in a predictable manner and discharge a certain quantity of liquid in response to a given head or pressure; and which permits a plurality of such nozzles to be located on the arms of the distributor in a manner to uniformly and continuously distribute liquid over the entire filter bed by spreading the sewage in a wide fan-shaped pattern and in a flat sheet or spray which also promotes its aeration.

A still further object of this invention is the provision of a nozzle for a rotary distributor having an outlet orifice which automatically changes in effective area in response to variations in the head or pressure of the sewage flowing through the nozzle; that is, the effective orifice area increases and decreases in response to increases and decreases in the sewage head with the result that the variations in the flow of sewage through the nozzle are greater than would be the case if the orifice area were fixed and only the sewage head were variable.

Still another object of this invention is to provide a nozzle structure for a rotary distributor comprising a hollow nozzle body having a beveled outer end and a pivoted deflector which, when no liquid is flowing through the nozzle, seats against the beveled end of the tube, and with the flow of liquid through the nozzle moving the deflector away from the tube end to define an orifice which varies in effective area in accordance with the head of the liquid.

A further object of the invention is to provide the hollow nozzle body with a relatively large bore which promotes a self-cleaning, flushing action and permits easy manual cleaning with a brush, or other tool, when the liquid flow is not sufficient to remove tenacious material from the hollow nozzle body.

Other objects and advantages of the invention will be apparent during the course of the following description.

In the accompanying drawings forming a part of this specification and in which like numerals are employed to designate like parts throughout the same, FIGURE 1 is a partial plan view of a rotary distributor equipped with nozzles embodying the present invention, FIGURE 2 is a vertical sectional view taken on line 2—2 of FIG. 1, FIGURE 3 is a side elevational view of a nozzle embodying the present invention shown attached to a distributor arm, FIGURE 4 is a plan view of the nozzle of FIG. 3, FIGURE 5 is a front elevational view of the deflector employed in the nozzle of FIG. 3, FIGURE 6 is a longitudinal, vertical sectional view of the nozzle of FIG. 3 and illustrating the position of the deflector when no liquid is flowing through the nozzle.

Figure 11:
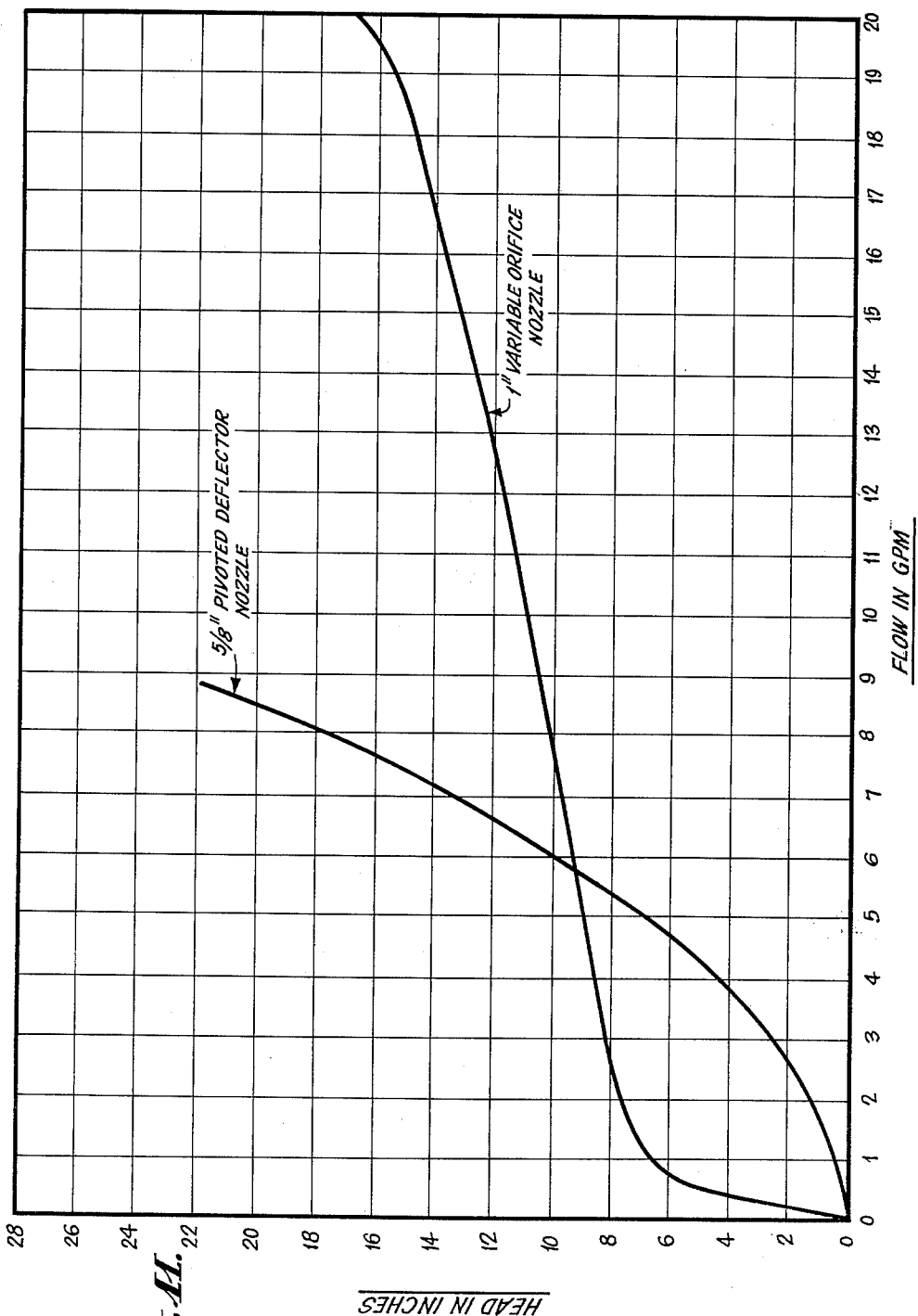

FIGURE 7 is a similar view to FIG. 6, but with the deflector shown in the position assumed during normal flow of liquid through the nozzle, FIGURE 8 is a side elevational view of the nozzle, but with the deflector raised for flushing or manual cleaning, FIGURE 9 is a graph which compares the head versus flow characteristics of a conventional fixed orifice area nozzle and of a variable effective orifice area nozzle made in accordance with this invention, FIGURE 10 is a graph which compares the head versus flow characteristics of three fixed-area nozzles with different sized orifices and of a variable effective orifice area nozzle made in accordance with this invention, FIGURE 11 is a graph which compares the head versus flow characteristics of a nozzle having a pivoted deflector and of a variable effective orifice area nozzle made in accordance with this invention, and FIGURE 12 is a graph which compares the head versus flow characteristics of a typical dual flow distributor and of a distributor equipped with variable effective orifice area nozzles made in accordance with this invention.

In the drawings, wherein for the purpose of illustration is shown the preferred embodiment of this invention, and first particularly referring to FIGS. 1 and 2, there is shown a trickling filter that includes a circular tank 20 containing a bed of any conventional filter medium 21.

In the center of the tank is a concrete support 22 on which the column 23 of the distributor 24 is rotatably mounted by suitable means well known in the art. Four hollow arms 25 are connected to the column 23 near its base and extend horizontally at 90° angles to each other from the column to their outer ends which are spaced slightly inwardly from the circular wall of the tank 20. Each of the arms 25 is supported vertically by an inclined rod 26 connected between the top of the column 23 and a point near the middle of the arm, and is maintained in proper angular relationship to its adjacent arms by the horizontal guy wires 27 connected as shown in FIG. 1.

In operation, liquid sewage is applied to the base of the column 23 by conventional means at a certain hydrostatic head for flow through the hollow arms 25. The liquid sewage in each of the arms 25 is discharged onto the bed of filter medium 21 through a series of right angularly arranged nozzles 28 that are connected to the arm at spaced points along its length. The flow of sewage through the nozzles of the arms produces a reactive force on the connected arms and the column 23 tending to drive the same in a direction opposite that of the flow through the nozzles. As viewed in FIG. 1, the nozzles 28 are each so located on the arms 25 that the flow therethrough is in a generally counter-clockwise direction with respect to the center of the column 23 and, therefore, the reactive forces developed by the nozzles will drive the arms in a clockwise direction.

Referring now to FIGS. 3 to 6 for a detail description of one of the nozzles 28, it will be noted that this device includes a hollow body 29 having external threads 30, or other suitable means, at its inner end 30a for effecting a connection with a distributor arm 25 whereby its bore 31 is placed in liquid communication with the interior 32 of the arm. The bore 31, which is circular and uniform in cross section, extends the entire length of the nozzle body 29 to the outer end 33 so as to define a flow passageway. This outer end 33 is beveled, or machined off, along a plane that is inclined with respect to the axis of the bore 31, to produce a surface 34 which surrounds the bore 31 and is adapted to face generally upwardly and outwardly when the hollow nozzle body 29 is properly connected to a distributor arm 25.

The beveled end surface 34 cooperates, as will be later described in more detail, with a deflector 35 which is mounted for pivotal movement between a position of sealing engagement with the surface 34 and various other positions in angularly spaced relationship with said surface. As best seen in FIGS. 4 and 5, the deflector 35 has a flat main portion 36 which is generally trapezoidal in shape, having a wide forward edge 37, a somewhat narrower base 38 and two side edges 39 of equal angularity.

Because the inner surface 40 of the deflector 35 and the beveled end surface 34 of the body 29 should engage or seat with a precision fit, FIGS. 4 and 5 illustrate the deflector 35 as it is initially cast with the pad 40a formed thereon and having a thickness of approximately 1/16 of an inch. The body, also, is cast with approximately 1/16 inch of excess material, not shown, on the beveled surface 34. The pad 40a and the said excess material are machined off to provide the final surfaces 34 and 40.

The dimensions of the flat portion 36 of the deflector 35 are such that its machined inner surface 40 is of sufficient extent to fully engage the beveled end surface 34 of the nozzle body 29, and to thereby completely cover the bore 31 when seated against the end surface 34. The deflector 35 also includes a downwardly and outwardly flaring skirt portion 41 formed along each of the side edges 39 and a downwardly extending skirt portion 42 which is formed along the base 38 and is provided with a notch 42a to receive the tube 29. The base skirt 42 is integral with the side skirts 41 so as to form a continuous skirt around the edges of the main portion 36 except for the wide forward edge 37 which has no skirt.

The deflector 35 is pivotally connected to the nozzle body 29 by means of an ear 43 which extends rearwardly from the base 38 of the main portion 36 and which fits between the arms 44 of a collar 45 that is formed integral with the nozzle body 29. The connection is completed by a pivot pin 46 inserted through the arms 44 and the ear 43 and which is so located with respect to the beveled end surface 34 and the undersurface 40 of the deflector 35 that the undersurface 40 will be seated flatly against the entire area of the beveled surface 34 when the deflector is in its lowermost position to entirely seal the bore 31 of the nozzle body 29, as shown by the solid lines of FIG. 3.

The pivotal connection between the deflector 35 and the nozzle body 29 permits the deflector to be moved from this closed position to various positions angularly spaced counterclockwise from that shown and at which the undersurface 40 is moved away from the beveled surface 34 to permit the flow of liquid from the bore 31, as hereinafter described. This counterclockwise or upward movement of the deflector 35 is limited by an upstanding portion 48 of the collar 45 which will be engaged by the ear 43 of the deflector when the latter is moved to the position shown by the broken lines of FIG. 3. When in the fully raised position, the center of gravity of the deflector 35 is located rearwardly of the pin 46 so that the deflector will remain in this position until it is again moved manually or by some other force to a position where it will cooperate with the beveled surface 34.

As will be obvious from FIG. 3, the pivotal mounting of the deflector 35 is such that, except when in its fully raised position, the deflector is urged by gravity toward engagement with the beveled surface 34 of the nozzle body 29. Therefore, when the nozzle is attached to a distributor arm which is not supplied with liquid, or which is receiving liquid at a very low hydrostatic head, the deflector is seated by gravity against the beveled surface 34 so as to close the bore 31 of the nozzle body to prevent the flow of liquid through said body. This latter condition may be best appreciated by reference to FIG. 6 which shows a longitudinal section through the nozzle when little or no hydrostatic head is present in its bore.

The deflector 35, however, is of such a weight that when liquid under an appreciable hydrostatic head is present in the nozzle body, the force produced by the hydrostatic head acting against the undersurface of the deflector is sufficient to move the latter away from the surface 34, by pivotal movement about the pin 46, to permit the flow of liquid from the nozzle. This condition is illustrated by the longitudinal sectional view of FIG. 7 from which it will be appreciated that the movement of the deflector 35 away from the surface 34 produces a slit-like orifice 50 which extends around the periphery of the bore 31, as is defined by the surface 34, and which is wider at its lower end 51 than at its upper end 52. When liquid flows through the orifice 50, the element 35 serves as a deflector for the liquid causing it to flow in various directions relative to the bore 31 and as a thin sheet through the slit-like orifice 50 to produce a resulting fan-shaped spray or sheet emitted from the nozzle. Liquid which leaves the sides of the orifice 50 and travels laterally of the deflector 35 impinges against the side skirts 41 and is thereby directed into a desirable path. This fan-shaped spray causes the sewage to be distributed to the regions between adjacent nozzles and also reduces the force with which the sewage strikes the filter medium, as is desired.

It should also be apparent that, for a given weight, the degree of deflector movement is dependent on the value of the hydrostatic pressure existing within the nozzle body 29. The higher the pressure within the body, the greater the distance the deflector will be moved away from the surface 34 and the greater will be the effective outlet area of the orifice 50. Therefore, it is seen that the effective orifice area of the nozzle is a function of the hydrostatic head existing in the nozzle body 29. If the hydrostatic head is not sufficient to overcome the weight of the deflector, the latter will remain seated against the beveled end surface 34 and the effective orifice area of the nozzle will be zero. The peculiar character of the head versus flow relationship for this nozzle will be discussed in more detail below in connection with the graphs of FIGS. 9 to 12.

In normal operation, the deflector 35 of the nozzle is positioned in front of the tube 29 at a fairly small angle to the beveled surface 34, as determined by the pressure or head in the bore of the nozzle. For cleaning purposes, however, the deflector 35 may be lifted manually to its fully raised position, as shown in FIG. 8, to permit a full flow of liquid through the tube. The force produced by this full flow is then generally sufficient to flush from the bore of the tube any tenacious material that may have accumulated therein. In the event, however, that the full flow is found to be insufficient to completely clean the tube bore, the movable deflector permits ready access to the bore for manual cleaning with a brush, or other tool.

In regard to the easy cleaning feature of the present nozzle, it should also be noted that the bore 31 has a cross-sectional area which is considerably larger than the effective area of the variable orifice even at maximum operating flow. On the other hand, in conventional fixed area nozzles, and in pivoted deflector nozzles such as those disclosed by the patent to Hubert Beddoes mentioned earlier, the outlet area of the orifice is determined by, and is of the same size as, the nozzle bore.

The variable effective orifice area provided by the nozzle structure of this invention produces a much more desirable head versus flow characteristic for the purpose of rotary distributors than does a conventional fixed orifice area nozzle. This may be seen by reference to FIG. 9 wherein the characteristic curves of a conventional fixed orifice area nozzle and of a variable effective orifice area nozzle, such as described above, are shown plotted on the same graph.

The performance of the fixed orifice area nozzle, as will be noted, follows closely the familiar parabolic curve given by the nozzle equation $Q = C_d A \sqrt{2gh}$, where Q is the flow, $C_d$ the discharge coefficient of the nozzle, A the outlet area of the nozzle, g the acceleration of gravity, and h the applied hydrostatic head. When nozzles of this particular type are installed on a conventional rotary distributor, it is found that a head of approximately six inches of water must be applied to each of the nozzles before the distributor starts rotating. At this head, the flow through each nozzle is approximately ten gallons per minute. Furthermore, it is usually desirable to maintain the head supplied to the nozzles at a value below 18 inches of water in order to avoid undue pumping costs. At this maximum desirable head, it will be seen from FIG. 9 that the fixed orifice area nozzle produces a flow of somewhat less than 18 gallons per minute. The range of flows available from the fixed area nozzle is therefore seen to be relatively limited, in this case a difference of less than 8 gallons per minute existing between the maximum and minimum flows.

Considering the variable effective orifice area nozzle, however, it is found that when a conventional distributor is equipped with these nozzles the distributor will start to rotate at an applied head of approximately six inches of water. At this head, however, the flow through each of the nozzles is only somewhat less than 4 gallons per minute. On the other hand, at the maximum desirable head of 18 inches of water the flow through each of the nozzles is about 38 gallons per minute. That is, the variable effective orifice area nozzle has a flow range of about 34 gallons per minute between maximum and minimum flows. Furthermore, in a distributor equipped with variable effective orifice area nozzles, it has been found that once the distributor starts to move, only a small and gradual increase in the speed of rotation will occur as the flow increases and that excessive rotational speeds are not developed at maximum flows.

The shape of the characteristic curve for a fixed orifice area nozzle, of course, depends on the outlet area of the particular nozzle in question. Regardless of the outlet area, however, the characteristic curve of such a nozzle will follow closely a parabolic curve according to the nozzle equation presented in FIG. 9. This is shown in FIG. 10 wherein the characteristic curve for a variable effective orifice area nozzle, made in accordance with this invention, is plotted on the same graph as the characteristic curves of three conventional fixed orifice area nozzles of relatively small, medium and large sizes, respectively.

Merely to provide a general comparison on this graph of the shapes of the characteristic curves of the represented nozzles, but without any intention of being limited to such dimensions, it may be considered that the size of the small fixed orifice area nozzle is approximately one-half inch, the medium fixed orifice area nozzle is approximately three-quarters of an inch, and the large fixed orifice area nozzle is approximately one inch, while the size of the body of the variable effective orifice area nozzle is approximately one and one-half inch. Because the primary purpose of the graph of FIG. 10 is to present a general comparison of the shapes of the characteristic curves of several different correspondingly sized nozzles, the scales for the coordinate axes of the graph have not been given.

Assuming that the desired head range extends between the values of $f$ and $g$ on the head axis of FIG. 10, it will be noted that the small fixed orifice area nozzle has a relatively narrow flow range of from $b$ to $c$ on the flow axis. The medium sized fixed orifice area nozzle has a somewhat wider flow range of between $d$ and $e$ on the flow axis; and, the large fixed orifice area nozzle has a still wider flow range of between $f$ and $g$ on the flow axis. Each of these flow ranges however is considerably smaller than the flow range of the variable effective orifice area nozzle which extends between the values of $a$ and $h$ on the flow axis and embraces the flow ranges of all of the fixed orifice area nozzles. While the fixed orifice area nozzles give the same head versus flow as the variable effective orifice area nozzle at some points on the graph, it is impossible for a fixed orifice area nozzle of any size to give the same characteristic curve as a variable effective orifice area nozzle.

The variable effective orifice area nozzle illustrated and described above also produces a much more desirable characteristic curve than other known attempts aimed at overcoming the deficiencies of the fixed orifice area nozzles. For example, in FIG. 11 a characteristic curve of a one-inch variable effective orifice area nozzle is shown plotted on the same graph as the characteristic curve of a five-eighth inch pivoted deflector nozzle and made in accordance with the patent to Hubert Beddoes, No. 2,046,865, mentioned previously. From this graph it will be observed that the pivoted deflector has little or no apparent effect on the characteristic curve, the nozzle having a curve which is parabolic in form and similar to that of a conventional fixed orifice area nozzle. Therefore, from FIG. 11 it will be readily apparent that for any given desired range of heads the variable effective orifice area nozzle will produce a much wider range of flows than the pivoted deflector nozzle.

In FIG. 12 the characteristic curve of a distributor equipped with one-inch variable effective orifice area nozzles is shown plotted on the same graph as the characteristic curve of a typical dual flow distributor equipped with conventional five-eighth inch fixed orifice area nozzles. In the dual flow distributor only two arms of the distributor are supplied with liquid when the liquid head applied to the distributor is less than a certain critical value $h'$. When the applied head exceeds $h'$, however, liquid is supplied to all four arms of the distributor causing the characteristic curve for the distributor to leave the initial parabolic path at A and to thereafter follow a less steep parabolic curve produced by the operation of the four arms.

Thus, it is seen that if the critical value of head $h'$ is designed to fall within the desired head range of the distributor a dual flow unit will produce a substantially wider flow range than a distributor without the dual flow feature. However, from FIG. 12 it will be noted that the flow range of a dual flow distributor is nevertheless much smaller than that obtainable with a distributor equipped with variable effective orifice area nozzles made in accordance with this invention. Given a desired head range of between a minimum value of head $m$ and a maximum value of head $n$, the dual flow distributor has a corresponding flow range which extends between the flow values $p$ and $q$, while for the same head range the distributor with variable effective orifice area nozzles has a flow range extending between the flow values of $p'$ and $r$. Accordingly, it is apparent that a distributor with variable effective orifice area nozzles is capable of handling a much larger flow, such as is often produced by storm flow to the sewage system, than is a dual flow distributor equipped with fixed orifice area nozzles which is designed to handle normal flow to the system.

It is to be understood that the form of this invention herewith shown and described is to be taken as the preferred example of the same, and that various changes in the shape, size and arrangement of parts may be resorted to without departing from the spirit of the invention or the scope of the subjoined claims.

Having thus described the invention, I claim:

1. An apparatus for distributing liquid sewage over a trickling filter bed, comprising a nozzle having a hollow body forming a flow passageway therethrough, the discharge end of said body having its edge beveled and adapted to be arranged to provide a generally upwardly and outwardly facing seating surface, a deflector having one face adapted to engage the seating surface of the nozzle to close the said flow passageway, means pivotally connecting one edge portion of the deflector to the nozzle body for free movement between its seating position and various other positions angularly arranged with respect to and above said upwardly and outwardly facing seating surface, said deflector being of generally trapezoidal shape in plan with its opposite side edges diverging away from the location of the pivotal connecting means, skirts formed on the opposite side edges of the deflector and angularly arranged with respect to its said nozzle body engaging face, said deflector having sufficient weight to retain it in its seating position against said nozzle body until the liquid head in the said passageway is increased to a value sufficiently high to overcome the force of gravity acting on said deflector, said deflector being moved into said other positions by liquid heads of increased values to vary the effective area of the outlet from said flow passageway.

2. An apparatus for distributing liquid sewage over a trickling filter bed, comprising a nozzle having a hollow body forming a flow passageway therethrough, the discharge end of said body having its edge beveled and adapted to be arranged to provide a generally upwardly and outwardly facing seating surface, a deflector having one face adapted to engage the seating surface of the nozzle to close the said flow passageway, and means pivotally connecting one edge portion of the deflector to the nozzle body for free movement between its seating position and various other positions angularly arranged with respect to and above said upwardly and outwardly facing seating surface, said deflector being of generally trapezoidal shape in plan with its opposite side edges diverging away from the location of the pivotal connecting means, and skirts formed on the opposite side edges of the deflector and angularly arranged with respect to its said nozzle body engaging face, said deflector having sufficient weight to retain it in its seating position against said nozzle body until the liquid head in the said passageway is increased to a value sufficiently high to overcome the force of gravity acting on said deflector, said deflector being moved into said other positions by liquid heads of increased values to vary the effective area of the outlet from said flow passageway, and said means pivotally connecting the deflector to the nozzle body permitting the deflector to be manually moved into a position out of the path of flow of liquid discharge from the nozzle body.

References Cited in the file of this patent

UNITED STATES PATENTS

| | | |
|---|---|---|
| 1,815,535 | Weitzel | July 21, 1931 |
| 1,965,912 | Strawn | July 10, 1934 |
| 2,029,268 | Lund | Jan. 28, 1936 |
| 2,046,865 | Beddoes | July 7, 1936 |
| 2,214,188 | Walker | Sept. 10, 1940 |
| 2,621,975 | Coles | Dec. 16, 1952 |
| 2,885,750 | Katzman et al. | May 12, 1959 |
| 2,917,241 | Waldrum | Dec. 15, 1959 |